June 8, 1926.

P. H. BOONE ET AL

LAND LEVELER AND SCRAPER

Filed March 13, 1923      3 Sheets-Sheet 1

1,588,005

INVENTORS:
Paul H. Boone and
G. Edward Garner
BY Ray S. Fehr
ATTORNEY.

INVENTORS:
Paul H. Boone & H. Edward Garner
BY Ray S. Cole
ATTORNEY.

Patented June 8, 1926.

1,588,005

UNITED STATES PATENT OFFICE.

PAUL H. BOONE AND GEORGE EDWARD GARNER, OF PHOENIX, ARIZONA.

LAND LEVELER AND SCRAPER.

Application filed March 13, 1923. Serial No. 624,773.

The invention relates to improvements in earth scrapers such as are used for grading, road construction, land leveling, and the like.

One object of the invention is the provision of a scraper which is adapted, without modification of its construction, for efficient use under widely varied conditions ranging from the leveling of irrigated agricultural lands to the grading and construction of roads.

Another object of the invention is the provision of a scraper of the character in question having a light draft in proportion to its capacity.

Another object of the invention is the provision of a scraper of the character in question having a simple and rugged construction, light weight, and ease of control.

Other objects, more or less ancillary to the foregoing, will be apparent from the following description of the preferred form of construction, illustrated in the accompanying drawings.

In the drawings, Fig. 1 is a side elevation of our improved machine, showing the scraper blade lifted to an inoperative position.

Figure 1:
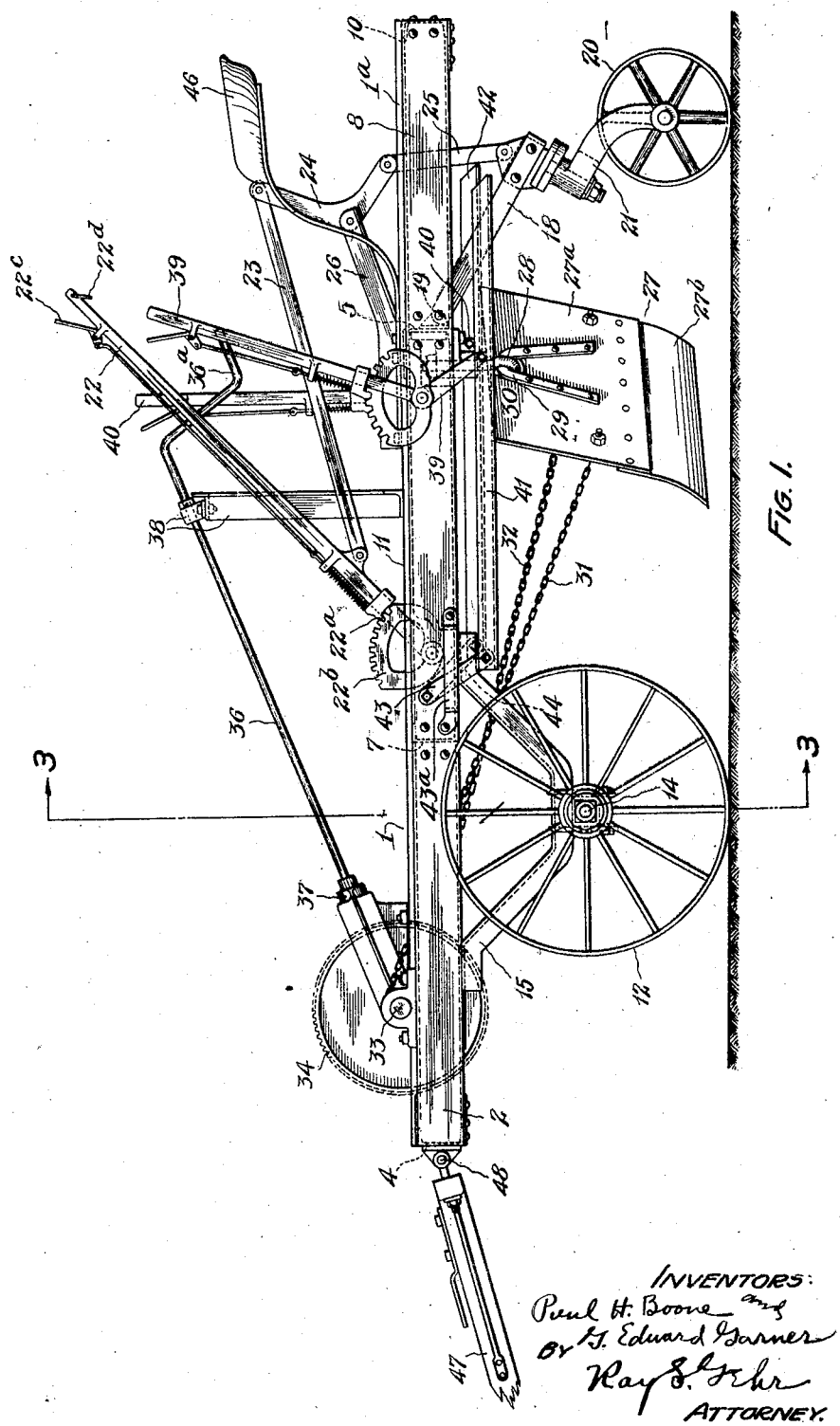
Figure 2:
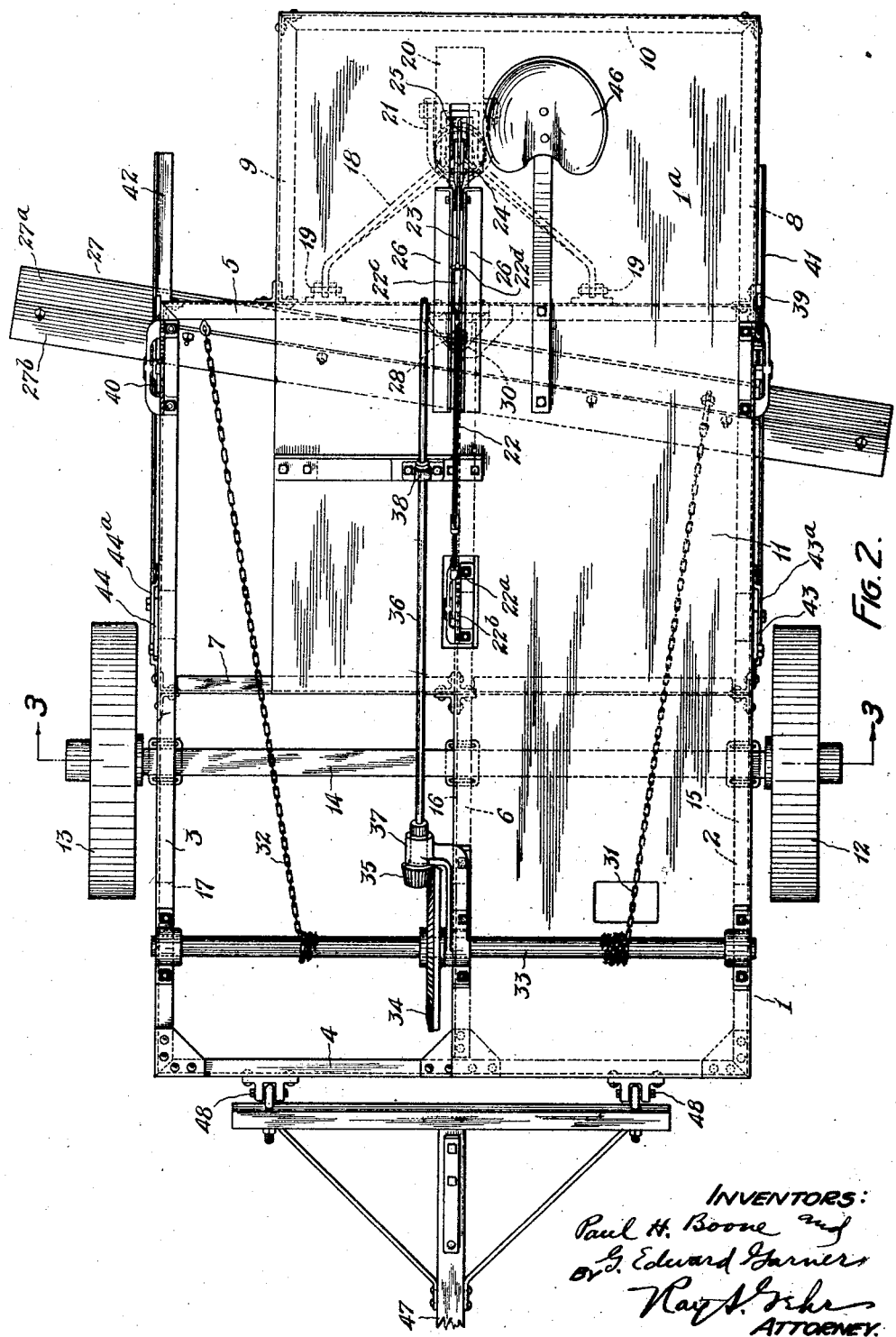
Fig. 2 is a plan view of the machine.
Figure 3:
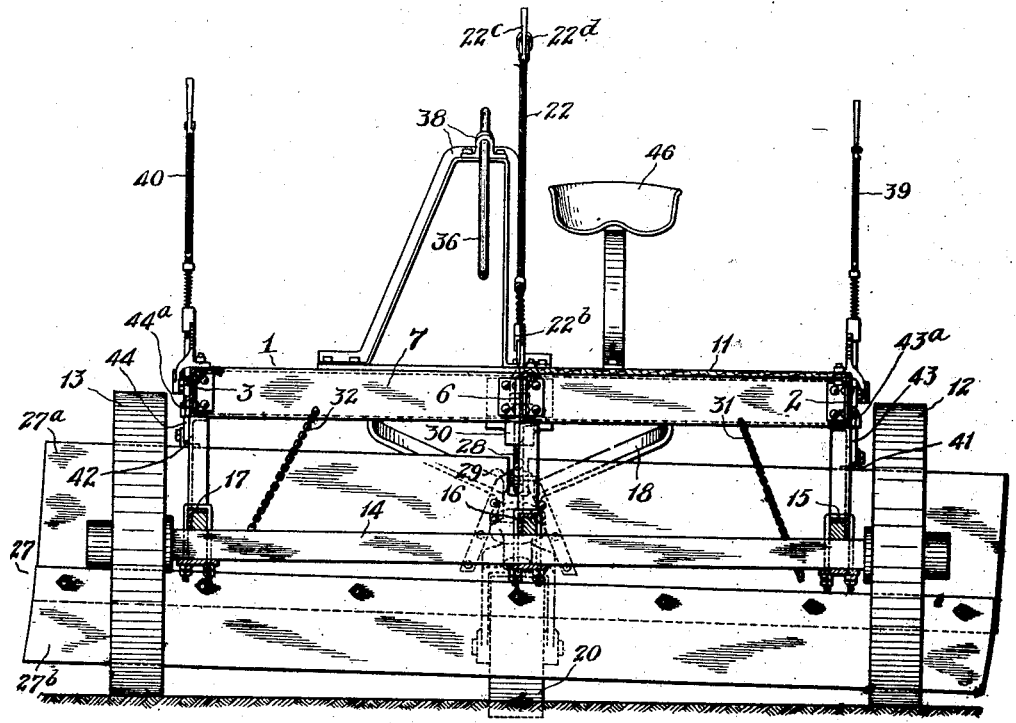
Fig. 3 is a section on the line 3—3, Figs. 1 and 2.

Referring in detail to the construction illustrated, the machine comprises a substantially horizontally disposed main frame designated in its entirety by 1 and comprising side bars 2 and 3, a front bar 4, a rear bar 5, a central longitudinal bar 6, and a central transverse bar 7. These frame bars can be of any suitable material and form but as illustrated they are in the form of iron bars of light-weight channel section and are rigidly secured together by plates or angle irons, and rivets, as indicated. The main frame carries a rear extension 1$^a$ having side bars 8 and 9 and a rear bar 10, the bars of said extension being rigidly riveted together and secured to the rear end of the main frame 1, as shown in Fig. 2.

The rear frame extension 1$^a$ and a portion of the main frame is covered by a platform 11 of boards or the like suitably secured to the frame members. This platform on the left side of the main frame extends substantially from the front end of the main frame to the rear end thereof, including the extension 1$^a$. The principal support for the main frame 1 is afforded by a pair of ground wheels 12 and 13 which are mounted on a transverse axle 14 rigidly secured to the V-shaped frame members 15, 16, 17 which depend from the underside of the frame bars 2, 6 and 3, respectively, and are rigidly riveted or bolted thereto.

Additional support for the rear part of the main frame is afforded by a V-shaped supplementary frame 18 which is connected by pivot pins 19, 19 to the transverse frame bar 5 of the main frame so that the two frames can swing relative to each other about the axis of said pins. The rear end of the frame 18 carries a ground-engaging caster wheel 20 which is mounted on a suitable swivelling yoke 21 carried by the frame 18. The relative angular relations of the main frame and of the supplementary frame can be controlled by means of a locking hand lever 22 which is mounted on the main frame and connected by link 23, bell crank 24 and link 25 to the rear end of the frame 18, the bell crank 24 being pivotally mounted on the rearwardly extending bracket bars 26 which are secured to the main frame. The lever 22 is provided with the usual locking bolt 22$^a$ which engages a toothed segment 22$^b$ and is actuated by the finger lever 22$^c$. The lever 22 is provided with a loop 22$^d$ and which can be thrown over into engagement with the lever 22$^c$ to hold the locking bolt 22$^a$ in inoperative position.

The main frame of the machine carries a transversely extending scraper blade 27 which comprises a body plate 27$^a$ and a cutting edge plate 27$^b$ secured thereto. The scraper blade is secured to and operatively supported from the main frame of the machine by means of an eye-bolt 28, the eye of which engages a loop 29 riveted to the scraper plate 27 midway between its ends. The eye-bolt 28 is swivelled in a bracket casting 30 which is bolted or riveted to the front side of the rear transverse frame member 5. A universally flexible support is thus provided for the scraper blade since the swivelling support of the eye-bolt permits the ends of the blade to be swung forward and backward, so as to bring it into different angular relations to the longitudinal axis of the machine, and the connection between the eye-bolt 28 and loop 29 permits the ends of the blade to be raised and lowered so as to bring it into different angular positions in relation to a horizontal plane.

The angular position of the blade in relation to the longitudinal axis of the machine is varied and maintained by means of chains 31 and 32 which have their ends respectively connected to the scraper blade at points near the left and right ends thereof while the front ends of said chains are secured to a transverse shaft 33 rotatably mounted in suitable bearings on the longitudinal frame members 2, 6 and 3. The shaft 33 carries a large bevel gear wheel 34 which is actuated by the bevel pinion 35 mounted on a shaft 36 which is rotatably supported in bearing brackets 37 and 38 carried by the main frame. The rear end of shaft 36 is provided with a hand crank 36$^a$ which can be turned to rotate the transverse shaft 33 to wind in and pay out the chains 31 and 32, said chains being wound upon the shaft 33 in opposite directions so that one is paid out as the other is wound up.

The angular relation of the scraper blade 27 to a horizontal plane is varied and maintained by locking hand levers 39 and 40 which are mounted on the left and right sides, respectively, of the main frame. These levers act on the scraper blade through bars 41 and 42 which are pivotally connected intermediate their ends to said levers, respectively, and are supported at their front ends by links 43 and 44 carried by the main frame bars 2 and 3, respectively. Guide bars 43$^a$ and 44$^a$ on the main frame bars 2 and 3 embrace the links 43 and 44 and prevent them from swinging laterally. The bars 41 and 42 engage the upper edge of the scraper blade 27 near its respective ends and by adjustment of levers 39 and 40, one or the other of said side bars can be depressed to correspondingly depress the adjacent end of the scraper blade 27, the other lever being at the same time adjusted to permit the other end of the scraper blade to correspondingly rise. By locking the levers 39 and 40 in their adjusted positions, the scraper blade 27 is securely held in any desired angular position in relation to a horizontal plane.

We preferably mount a driver's seat 46 on the rear part of the main frame over the scraper blade 27 and in convenient relation to the hand lever 22, the crank 36$^a$ and the hand levers 39 and 40.

Suitable draft devices are applied to the front part of the main frame and preferably to the front end thereof. Where draft animals are to be used I preferably provide a tongue 47 of usual construction and pivotally connect the same by connections 48 to the front frame bar 4.

The operation of our improved machine will now be readily understood. The angular adjustments of the scraper blade 27 on its swivelling and pivotal support by means of the hand crank 36$^a$ and the levers 39 and 40 have been explained above. But with respect to the raising and lowering of the blade it remains to be pointed out that the main supporting wheels 12, 13 are disposed at points between the front and rear ends of the main frame such that the weight of the parts of the structure to the rear of said supporting wheels does not greatly exceed the weight of the parts to the front of said supporting wheels. Consequently, the rear part of the main frame can readily be elevated to lift the scraper blade 27 to an inoperative position or to any desired intermediate position to give various depths of cut. For example, the driver can stand on the platform 11 and by shifting his position forward and backward determine the vertical adjustment of the scraper blade. By standing on the rear part of the frame platform he can force the blade fully into the earth or by moving forward somewhat can permit the blade to rise to a higher working position, or by moving to the front part of the platform in front of the ground wheels 12, 13 can cause the scraper blade to rise entirely out of the ground. When the vertical position of the scraper blade is controlled by such movement of the driver the lock 22$^a$ of the hand lever 22 is of course secured in inoperative position by the loop 22$^d$ so that the main frame 1 and the supplementary frame 18 are free to swing in relation to each other on their pivotal connection.

I prefer, however, to make use of the hand lever 22 for the vertical adjustment of the scraper blade as a steadier and more reliable control of said blade is secured when the driver remains in the seat 46 or standing on the rear part of the main frame over the scraper blade. The driver from his seat 46 can readily actuate the lever 22 so as to exert a downward pressure on the rear end of the supplementary frame 18 and its caster wheel 21 thus elevating the rear part of the main frame and the scraper blade. At the same time the angle of the blade to the longitudinal axis of the machine can be varied at will by actuating the hand crank 36$^a$ while the angle of the blade to a horizontal can be changed, as previously described, by actuating the hand levers 39 and 40.

By the relative disposition of the main supporting wheels, as described, so that the machine is nearly balanced on said wheels and by relying upon the weight of the driver to force the blade into the earth we have produced a machine that is relatively light considering its capacity. In this connection it may be observed that when the scraper blades is in working position in the earth practically no load is taken by the supplementary frame 18 and caster wheel 20, and even when the supplementary frame is forced downward to lift the scraper blade the stresses on the supplementary frame and caster wheel are relatively light so that these parts do not have to be made heavy.

It has previously been proposed to construct land leveling scrapers with the scraper blade in front of the main supporting wheels but we have found that our construction with the blade disposed behind the main supporting wheels affords numerous advantages over said prior form of construction. In the first place a machine of given size and weight with our construction will move more dirt. Again it does the work with a minimum of power because the main supporting wheels function effectively when a load is thrown on the scraper blade, whereas, with a machine having the blade in front of the main supporting wheels, the machine tends, when the blade is heavily loaded to ride on the blade so that much of the anti-friction action of the supporting wheels is lost. Furthermore, since with our construction the main supporting wheels bear a large part of the load, lateral skidding of the machine is reduced to a minimum.

As compared with prior scrapers of the two-wheel type, our form of construction with the supplementary supporting frame and caster wheel obviates the tendency of machines of the two-wheeled type to dip or drop into waves or uneven places in the ground and insures that the blade will be held steadily in a uniform position.

Figure 4:
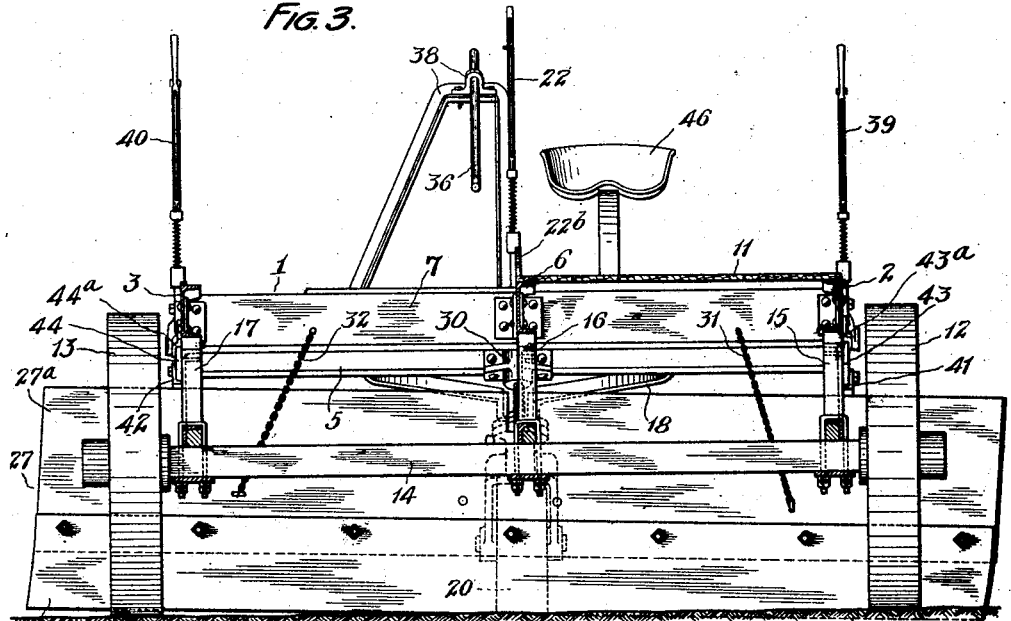
Fig. 4 is a view similar to Fig. 3 showing the machine on uneven ground with the blade adjusted to level the ground.

The manner of handling our improved machine in various classes of work will be readily understood, by those familiar with such work, from the foregoing description. A typical adjustment of the blade for land leveling is indicated in Fig. 4 of the drawings. This is to be taken merely by way of example as the machine is adapted not only to work under various conditions encountered in irrigation farming but also in the grading and constructing of roads and in fact under practically any conditions under which an earth scraper can be employed.

While the form of construction illustrated and described is such as we prefer, it is to be understood that various other forms of construction can be employed without departing from our invention, the scope of the invention being indicated by the appended claims.

What we claim is:

1. In a machine of the character set forth, the combination of a main frame; draft devices attached to the front part of said frame; a pair of ground-engaging supporting wheels for the frame disposed at points between the front and rear ends thereof so that the frame can swing upward and downward about a transverse axis through said wheels; a scraper blade; connecting means between said blade and the rear part of the frame adapted to permit adjustment of the blade relative to the frame about upright and horizontal axes; and means for holding the blade in adjusted position; said supporting wheels being disposed so that the weight of the structure in front of the wheels largely counterbalances the weight thereof to the rear of the wheels and the said connecting means between the blade and frame being adapted to lift the blade when the rear end of the frame swings upward and to force the blade downward into the ground when the rear end of the frame swings downward.

2. In a machine of the character set forth, the combination of a main frame; draft devices attached to the front part of said frame; a pair of ground-engaging supporting wheels for the frame disposed at points between the front and rear ends thereof; a scraper blade; means forming a connection between the scraper blade and the rear part of the main frame adapted to permit adjustment of the blade about an upright axis; and means for holding the blade in adjusted position; the said supporting wheels being disposed so that weight of the structure in front of the wheels largely counterbalances the weight thereof to the rear of the wheels and the connection between the blade and frame being adapted to lift the blade when the rear end of the frame swings upward about its wheel support and to force the blade downward into the ground when the rear end of the frame swings downward.

3. In a machine of the character set forth, the combination of a main frame; draft devices attached to the front part of said frame; a pair of ground-engaging supporting wheels for the frame disposed at points between the front and rear ends thereof; a scraped blade; means forming a pivotal connection between the middle portion of the scraper blade and the rear part of the main frame adapted to permit adjustment of the blade about both upright and horizontal axes; and means for holding the blade in adjusted positions; the said supporting wheels being disposed so that the weight of the structure in front of the wheels largely counterbalances the weight thereof to the rear of the wheels and the connection between the blade and frame being adapted to lift the blade when the rear end of the frame swings upward about its wheel support and to force the blade downward into the ground when the rear end of the frame swings downward.

4. In a machine of the character set forth, the combination of a main frame; draft devices attached to the front part of said frame; a scraper blade operatively connected to the rear part of said frame; a pair of ground-engaging supporting wheels for the main frame disposed at points between the front and rear ends thereof such that the weight of the structure in front of the wheels largely counterbalances the weight thereof to the rear of the wheels; a supplementary frame pivotally connected at its front end to the rear part of the main frame; means comprising a caster wheel supporting the rear end of the supplementary frame; and means for swinging the two frames relative to each other about said pivotal connection to thereby raise and lower the scraper blade.

5. In a machine of the character set forth, the combination of a main frame; draft devices attached to the front part of said frame; a scraper blade operatively connected to the rear part of said frame; a pair of ground-engaging supporting wheels for the main frame disposed at points between the front and rear ends thereof such that the weight of the structure in front of the wheels largely counterbalances the weight thereof to the rear of the wheels; a supplementary frame pivotally connected at its front end to the rear part of the main frame; means comprising a caster wheel supporting the rear end of the supplementary frame; and means for swinging the two frames relative to each other about said pivotal connection and for securing them in different angular relations to vary the vertical adjustment of the scraper blade.

6. In a machine of the character set forth the combination of a main frame; draft devices attached to the front part of said frame; a scraper blade; means forming a pivotal connection between the middle section of the scraper blade and the rear part of the main frame adapted to permit adjustment of the blade about upright and horizontal axes; means for holding the blade in adjusted position; a pair of ground-engaging supporting wheels for the main frame disposed at points between the front and rear ends thereof such that the weight of the structure in front of the wheels largely counterbalances the weight thereof to the rear of the wheels; a supplementary frame pivotally connected at its front end to the rear part of the main frame; means comprising a caster wheel supporting the rear end of the supplementary frame; and means for swinging the two frames relative to each other about said pivotal connection to thereby raise and lower the scraper blade.

7. In a machine of the character set forth, the combination of a main frame, draft devices attached to the front part of said frame; a scraper blade; means forming an operative connection between the blade and the rear part of the main frame adapted both to lift the blade and to force it downward as the frame rises and falls, respectively, and adapted also to permit adjustment of the blade relative to the frame about upright and horizontal axes; means for holding the blade in adjusted position; a pair of ground-engaging supporting wheels for said frame disposed at points between the front and rear ends thereof such that the weight of the structure in front of said wheels largely counterbalances the weight thereof to the rear of the wheels so that a moderate force will swing the structure about its wheel support; and a driver's seat mounted on the rear part of the main frame so that the weight of the driver when in the seat effectively forces the scraper blade into the ground.

8. In a machine of the character set forth the combination of a main frame; draft devices attached to the front part of said frame; a scraper blade; means forming a connection between the scraper blade and the rear part of the main frame adapted to permit adjustment of the blade about upright and horizontal axes and to lift the blade and to force it downward into the ground as the rear part of the frame rises and falls, respectively; means for holding the blade in adjusted position in relation to the frame; a pair of ground-engaging supporting wheels for the main frame disposed at points between the front and rear ends thereof such that the weight of the structure in front of the wheels largely counterbalances the weight thereof to the rear of the wheels; and a driver's platform on the main frame extending in front and to the rear of the said supporting wheels.

9. In a machine of the character set forth, the combination of a main frame; supporting wheels therefor; a scraper blade; a pivotal supporting connection between the blade and the main frame at a point approximately midway between the ends of the blade, said connection being adapted to permit the ends of the blade to swing forward and backward and upward and downward relative to the main frame; means for holding the blade at different working angles to the longitudinal axis of the machine; and means engaging the end parts of the blade to hold it at different working angles to a horizontal plane.

10. In a machine of the character set forth, the combination of a main frame; supporting wheels therefor; a scraper blade; a pivotal supporting connection between the blade and the main frame at a point approximately midway between the ends of the blade, said connection being adapted to permit the ends of the blade to swing forward and backward and upward and downward; means for holding the blade at different working angles to the longitudinal axis of the machine; and means for holding the blade at the different working angles to a horizontal plane comprising vertically movable fore-and-aft bars connected to the main frame so as to overlie and engage the upper edge of the blade near its two ends, respectively; and means for holding the bars in different vertical positions.

In testimony whereof, we hereunto affix our signatures.

PAUL H BOONE.
G. EDWARD GARNER.